Figure 1:
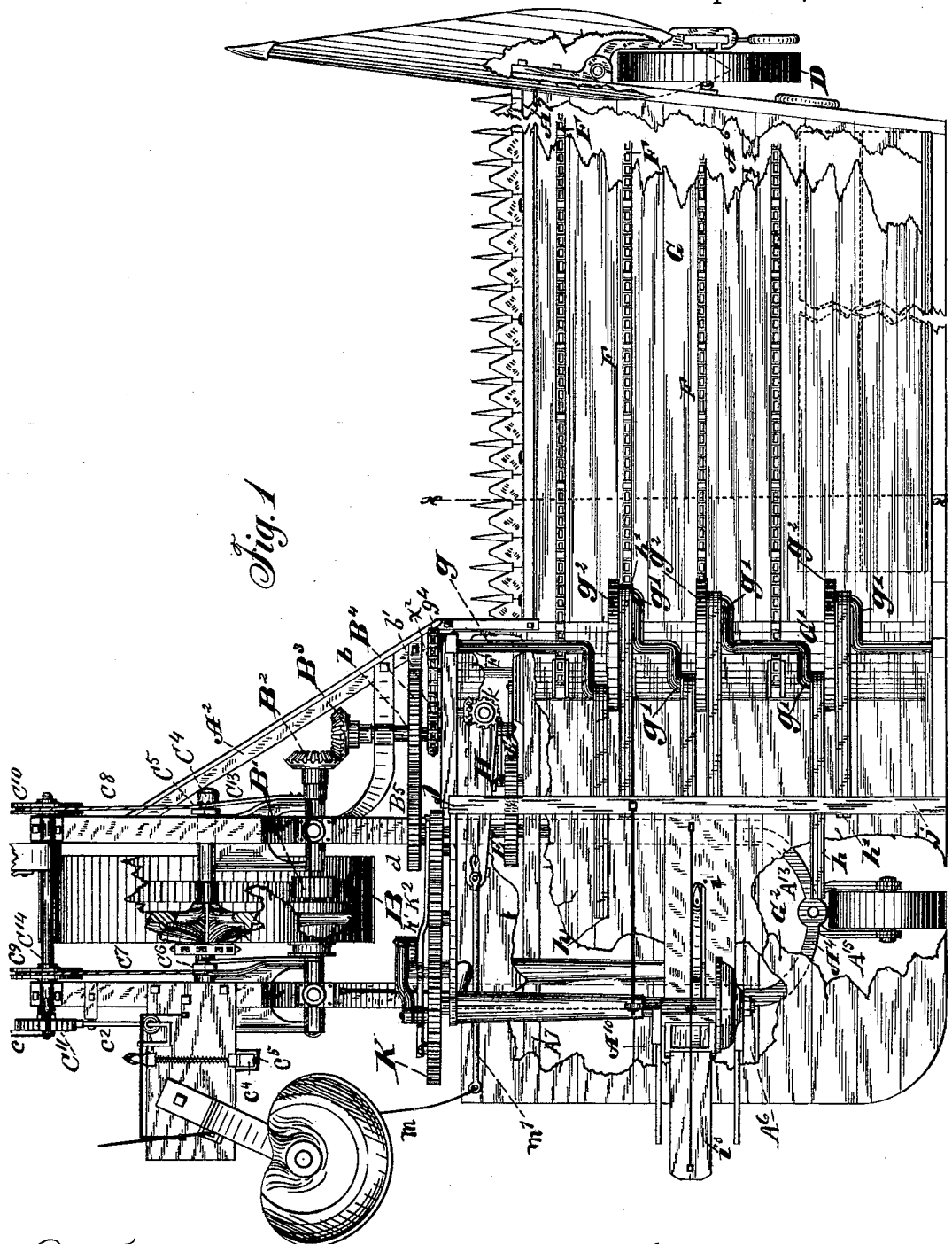

(No Model.)  10 Sheets—Sheet 1.

W. F. OLIN.
SELF BINDING HARVESTER.

No. 326,884. Patented Sept. 22, 1885.

Witnesses:
John B. Kaspari
J. F. Stewart

Inventor:
William F. Olin

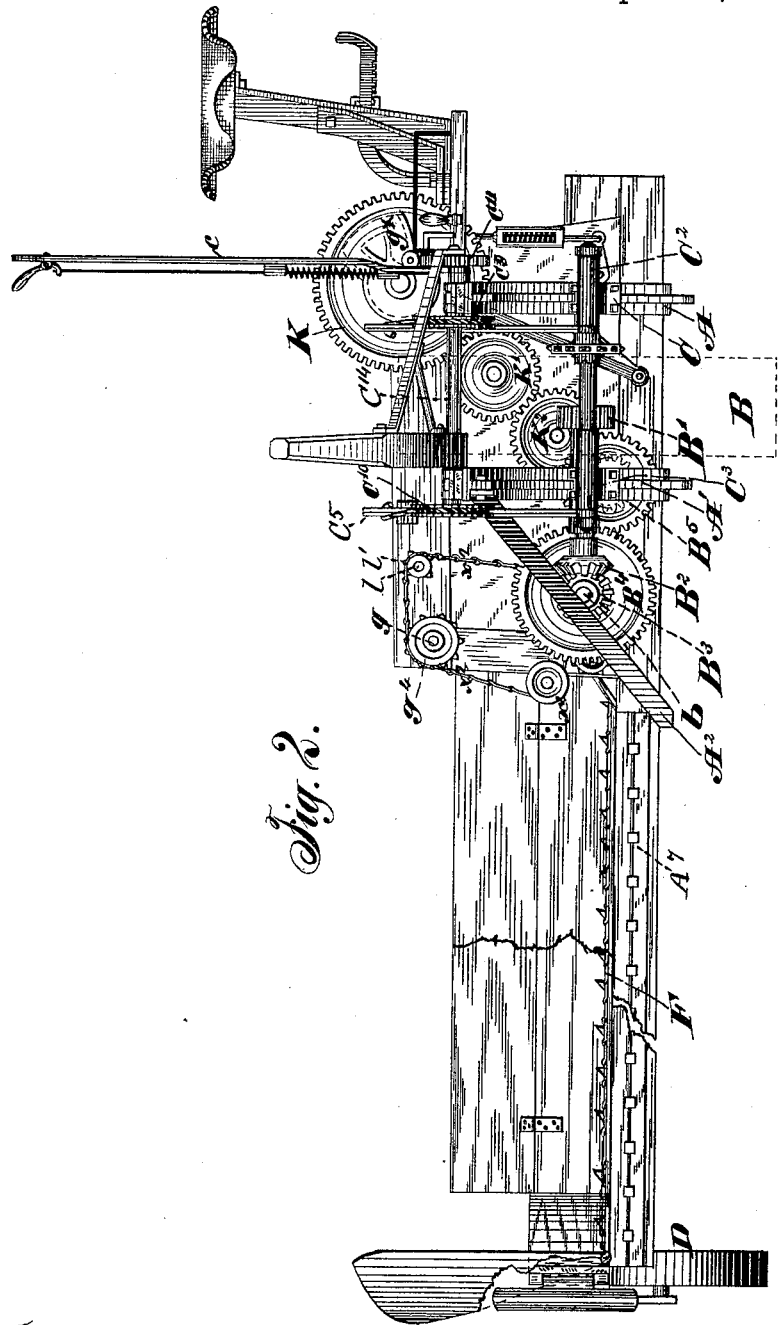

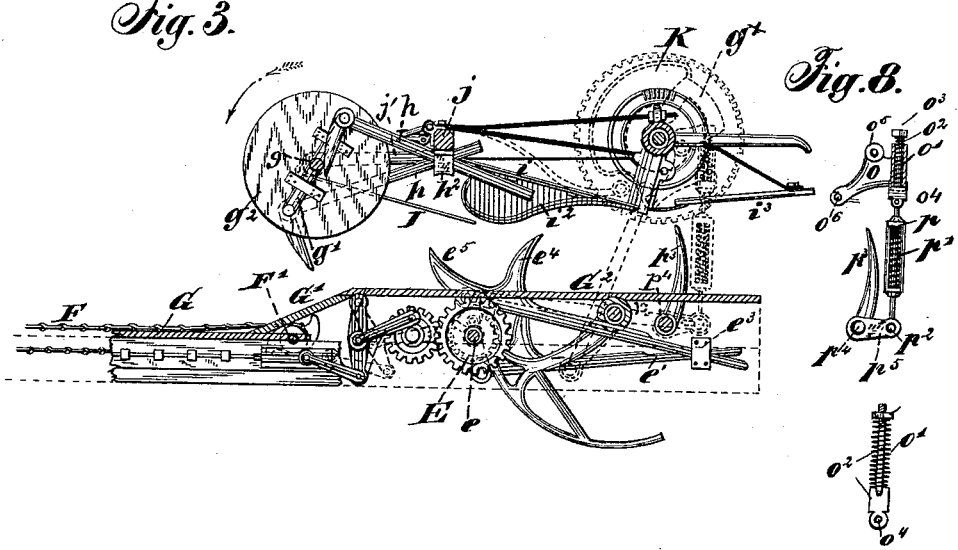
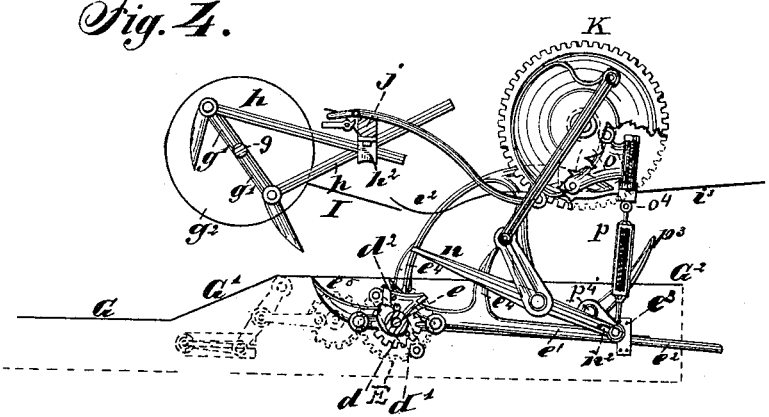

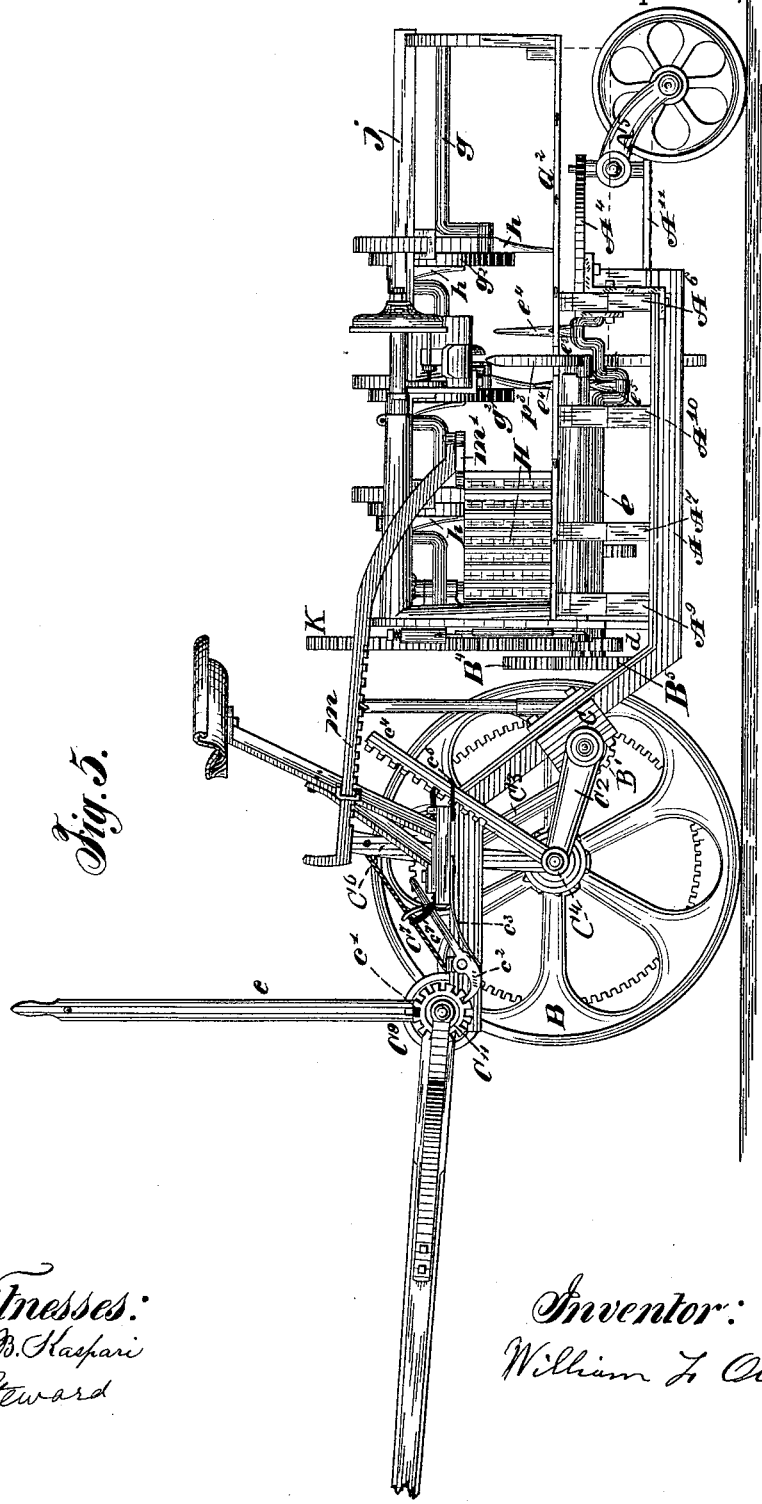

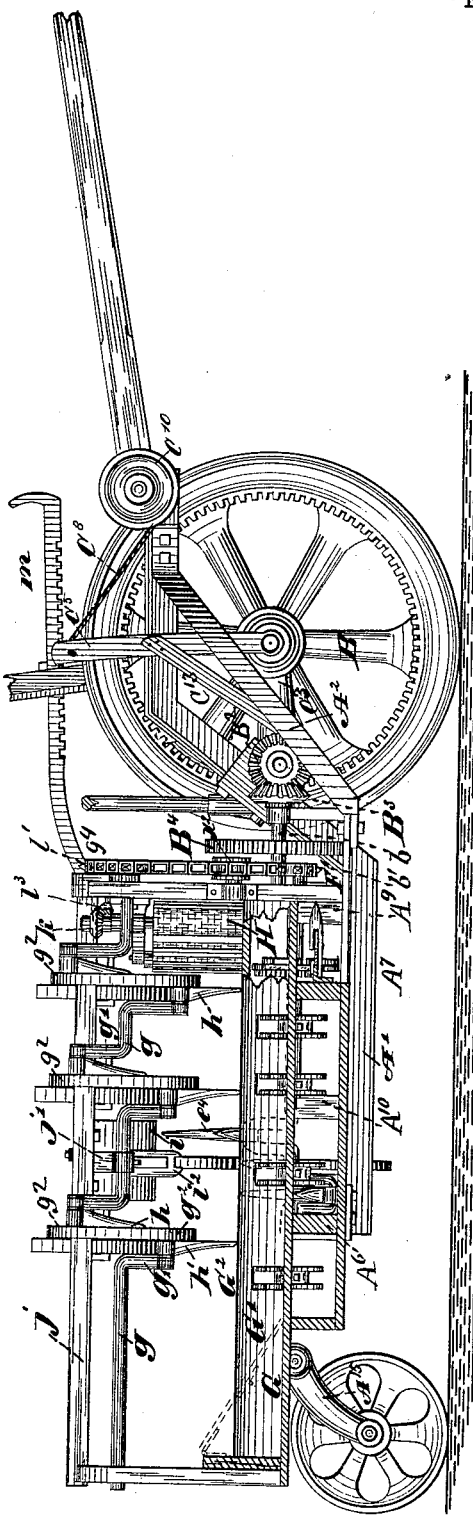

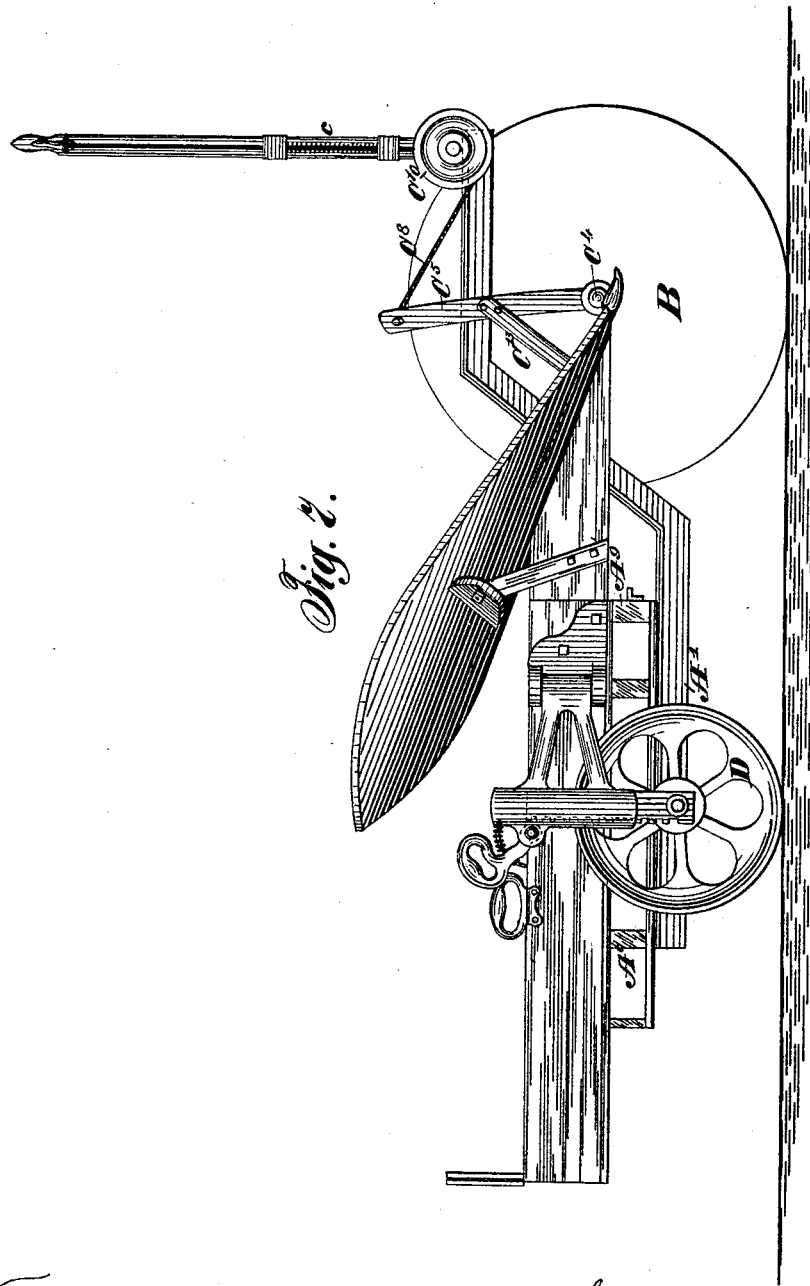

(No Model.)   W. F. OLIN.   10 Sheets—Sheet 7.
SELF BINDING HARVESTER.
No. 326,884.   Patented Sept. 22, 1885.
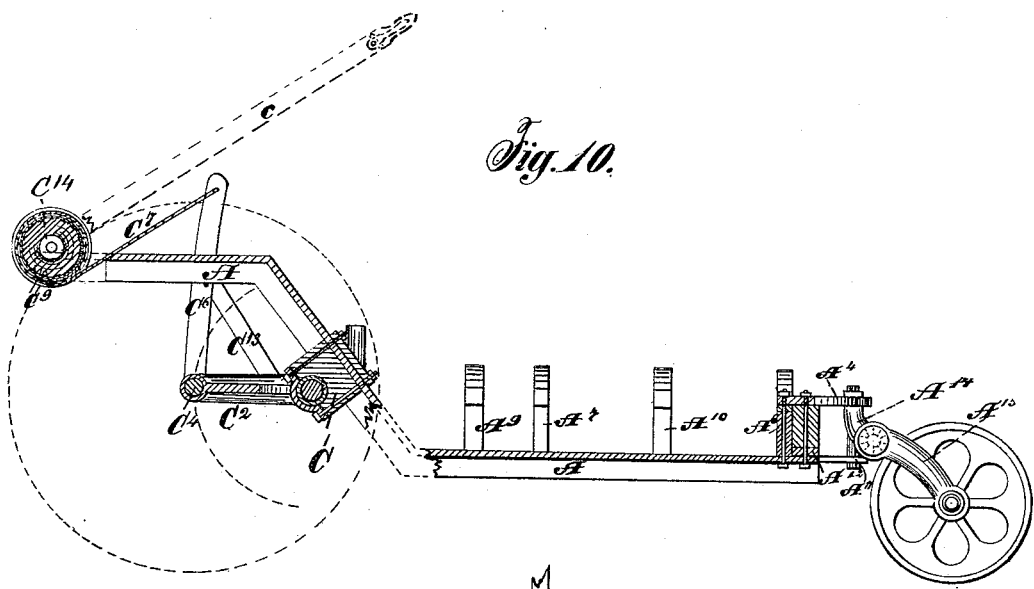
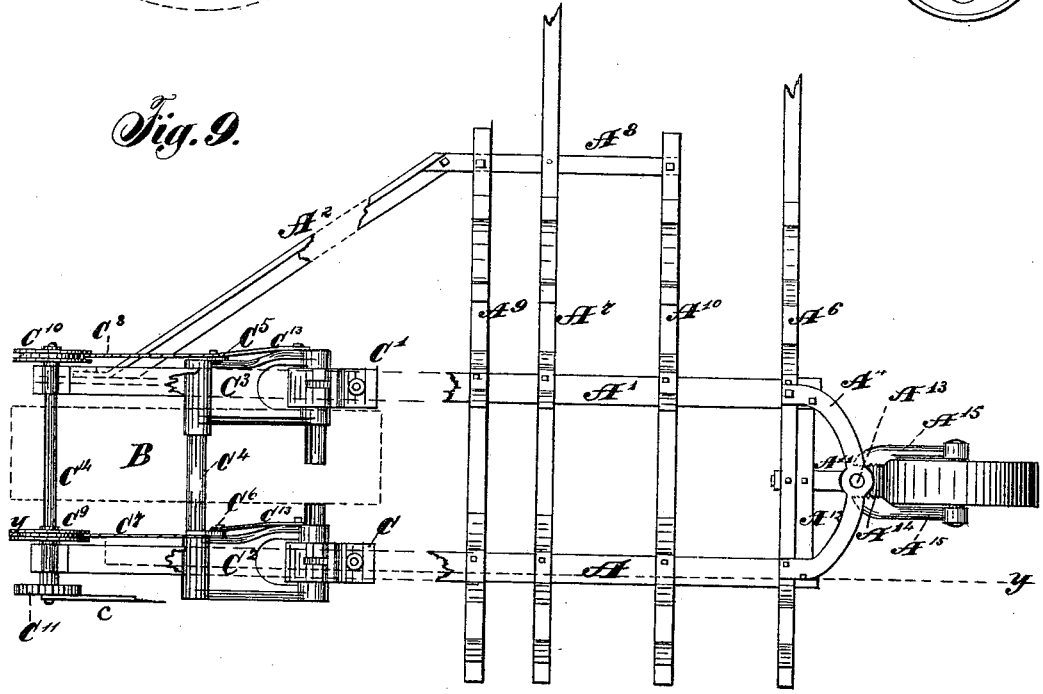

(No Model.) 10 Sheets—Sheet 8.
W. F. OLIN.
SELF BINDING HARVESTER.
No. 326,884. Patented Sept. 22, 1885.
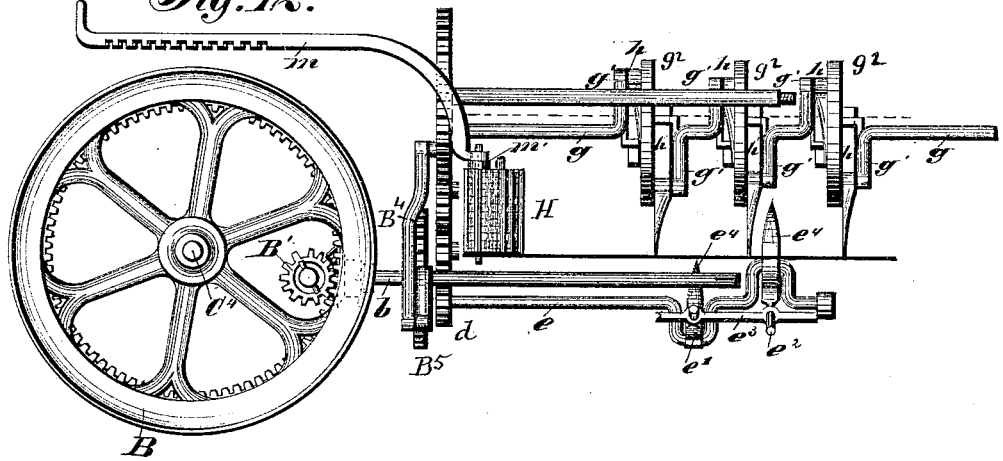
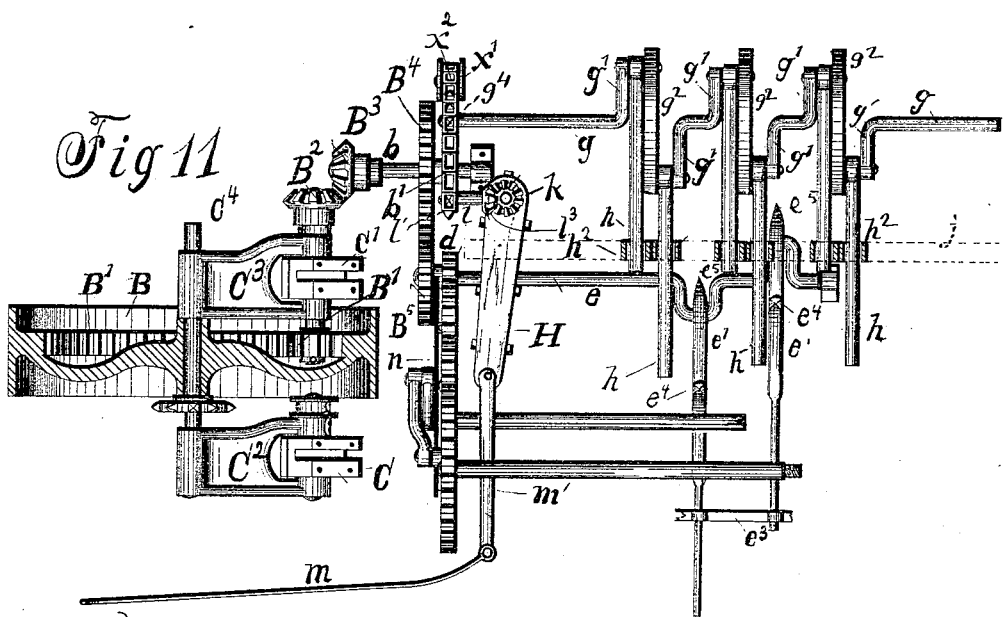
Witnesses:
John B. Kaspari
James Gilchrest
Inventor:
William F. Olin
By J. F. Steward
His Atty

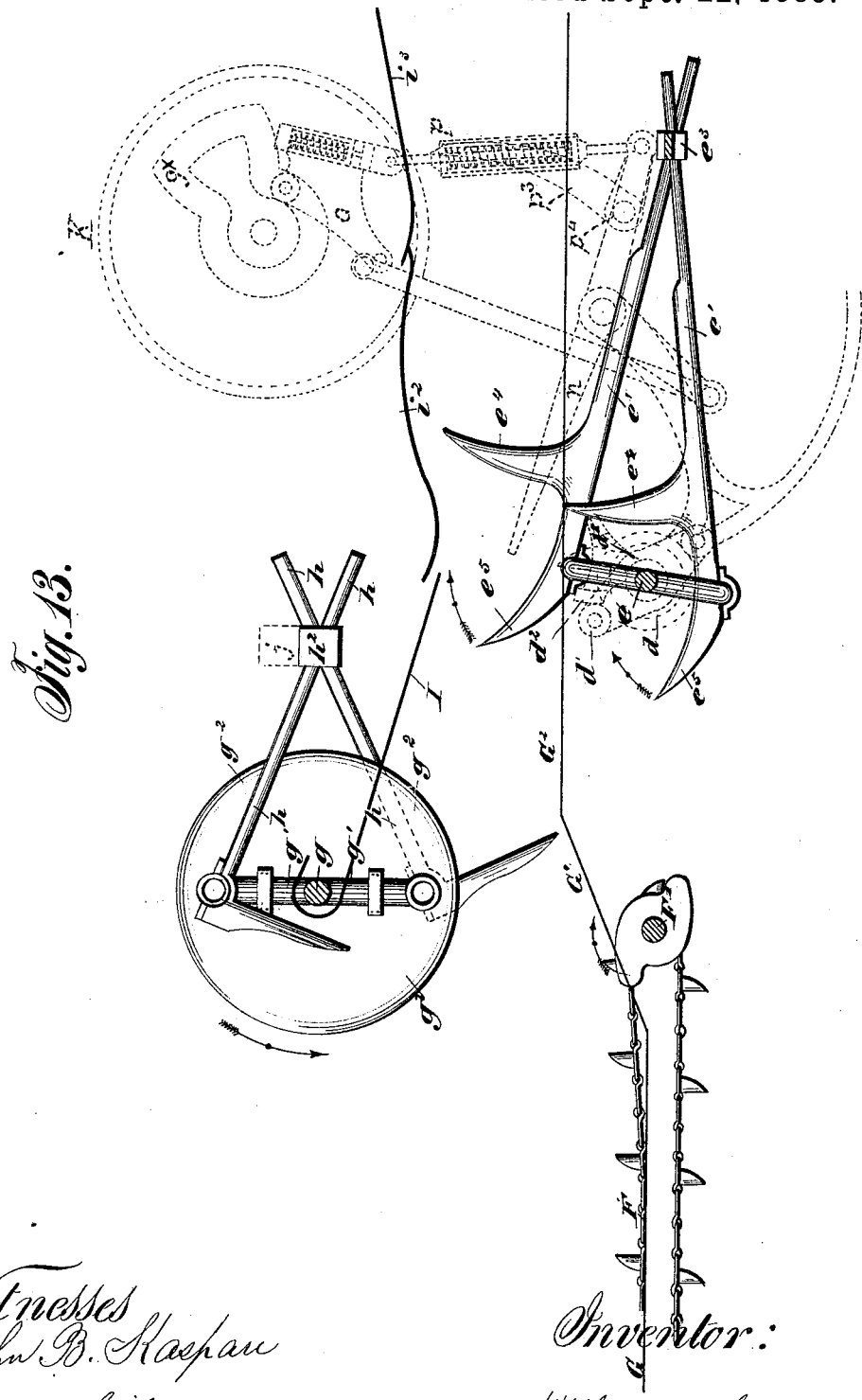

(No Model.) 10 Sheets—Sheet 10.
W. F. OLIN.
SELF BINDING HARVESTER.
No. 326,884. Patented Sept. 22, 1885.
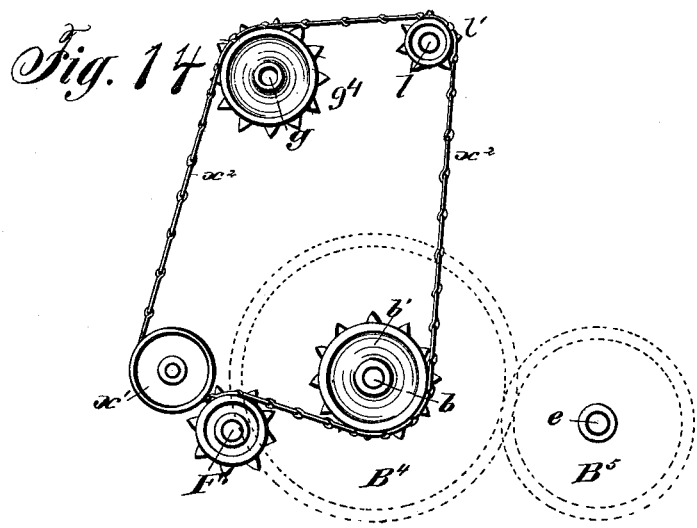
Witnesses:
John B. Kaspari
James Gilchrest
Inventor:
William F. Olin
By J. F. Steward
His Atty

United States Patent Office.

WILLIAM F. OLIN, OF CHICAGO, ILLINOIS, ASSIGNOR TO WILLIAM DEERING, OF SAME PLACE.

SELF-BINDING HARVESTER.

SPECIFICATION forming part of Letters Patent No. 326,884, dated September 22, 1885.

Application filed December 18, 1882. (No model.)

*To all whom it may concern:*

Be it known that I, WILLIAM F. OLIN, of the city of Chicago, county of Cook, and State of Illinois, have invented certain new and useful Improvements in Self-Binding Harvesters, of which the following is a full description, reference being had to the accompanying drawings, in which—

Figure 1 is a plan view with certain parts broken away to expose others and to shorten the figure. Fig. 2 is a front view, the driving-wheel being omitted, but its position shown by dotted lines. Fig. 3 is a front elevation showing the conveying and pushing mechanism, the needle, and the tripping device, and sickle-driving mechanism. Fig. 4 is a front elevation of the same with the parts in different positions. Fig. 5 is an elevation of the stubble side of the machine. Fig. 6 is a vertical section on the line $x\,x$ of Fig. 1. Fig. 7 is an elevation of the grain side of the machine. Fig. 8 is a front elevation of the compressor and its connection with the trip. Fig. 9 is a plan view of the frame of the machine. Fig. 10 is a vertical section of the same on the line $y\,y$ of Fig. 9. Fig. 11 is a skeleton plan view of the cranked shafts and the binder shaft and their driving-gears. Fig. 12 is a side elevation of the same on the stubble side of the machine. Fig. 13 is a front elevation of the conveyers and pushers, showing also by dotted lines parts of the binder and operating mechanism. Fig. 14 shows the binder-driving chain.

The object of my invention is to produce a machine that will take the grain from the delivery-apron, on which it falls as it is cut, and compact and bind it with the least elevation; and its nature consists in devices and arrangements of parts to attain this end.

A and A' are parallel bars bent as shown in Figs. 5, 6, 7, and 10, made of T-iron, with the stem of the T downward, which bars are tied together by the beams $A^6$, $A^7$, $A^9$, and $A^{10}$, bolted securely thereto. The beams $A^6$ and $A^7$ form the platform-sills. The beam $A^7$ serves also as a finger-bar for supporting the cutting apparatus. $A^8$ is a bar connecting the beams $A^9$ and $A^{10}$. From the front end of the bar $A^8$ to the front end of the bar A' extends the brace $A^2$. To the sill $A^6$ is secured the strongly-made yoke $A^4$, extending backward. The yoke is further supported by a supplemental block, $A^{12}$, secured to the bars A A' alongside of the sill $A^6$. At the middle of the bend of the yoke is the eye $A^{13}$. Extending from below the sill $A^6$ and supplement block $A^{12}$ is the flat bar $A^{11}$, with an eye immediately below that in the yoke. A pin or king-bolt passes through these eyes, and on it swings the casting $A^{14}$. To this casting is secured the wheel-arm $A^{15}$, to which the caster-wheel is journaled. The casting $A^{14}$ and arm $A^{15}$ are provided with disk-faces radially corrugated, and are clamped together by a strong bolt, so that the relative positions of the two parts may be changed, and the height of the frame be varied in the usual manner. I place this caster-wheel beneath the frame in such relation to the front or traction wheel that it shall "track" therewith, and thus travel over compacted soil, and avoid unnecessary draft.

About midway upward on the inclined part of the bars A and A' are bolted, one to each bar, the blocks C and C', which form a pivot on which the arms $C^2$ and $C^3$ vibrate. In Fig. 9 the frame-bars above are broken away and these parts exposed. They consist of castings, substantially alike, with an eye at each end, the distance apart from center to center of the eyes being equal to the radius of the pitch-circle of the driving-gear, less the radius of the pitch-circle of the pinion B' meshing therewith. The wider end of each arm has a portion removed, and the metal left at the end forms a cylindrical sleeve concentric with the eye. This sleeve forms the pivot for the arm, and is boxed into the under side of the supporting-block C or C'. Through the eyes in the other ends of these arms passes the non-rotating main axle $C^4$, the three parts being firmly keyed together after the drive-wheel is placed upon the axle. The drive-wheel or traction-wheel B is thus mounted in a frame, which is adapted to vibrate relative to the main frame in a vertical direction around an axis coincident with that of the pinion, which meshes with the gear on the drive-wheel; and hence the engagement of the pinion and gear-wheel is never disturbed.

When the driving-wheel is in place and the frame supported thereon, the supplemental frame, consisting of the arms $C^2$ and $C^3$ and fixed axle C, vibrates in the hub of the wheel, and thus the main frame may be varied in height. My mechanism for varying the height consists of the arms $C^5$ and $C^6$, firmly secured to the arms $C^2$ and $C^3$ by bolts and braces $C^{12}$. Into the upper ends of these arms are secured the wire ropes $C^7$ and $C^8$.

$C^{14}$ is a shaft having the sheaves $C^9$ and $C^{10}$ keyed thereto, in the grooves of which the wire ropes are wound, said shaft also bearing the ratchet-wheel $C^{11}$.

$c$ is a latch-lever, the latch $c'$ of which is adapted to enter the spaces between the teeth of the ratchet-wheel. The lever vibrates freely on the shaft $C^{14}$, unless locked to the ratchet-wheel. $c^2$ is a lever-pawl pivoted to the main frame in proper position to engage with the teeth of the ratchet-wheel, and which is extended backward and upward within reach of the foot of the attendant when in his seat. $c^3$ is a spring designed to hold the pawl always in contact with the ratchet-teeth when not forcibly disengaged. It will be understood that by using this lever, as often employed, the wire ropes may be taken up or let out at will and the main frame elevated or depressed, as the operator may wish, without stopping the machine.

Under ordinary circumstances the gear on the drive-wheel rotates the pinion which meshes with it; but if the pinion cannot rotate from any cause—as, for instance, clogging of the sickle or binding mechanism—the rotation of the driving wheel will have a tendency to lift the whole frame; hence the supplementary-wheel frame must be locked in its relative position to the main frame. I therefore provide the straight ratchet or rack $c^4$, pivoted on the axle and passing upward through a guide, $c^5$, bolted to the main frame. Into the teeth of this rack fits the end of a spring-bolt, which, being provided with the foot-rest $c^7$, is under control of the attendant. When necessary to make any adjustment, the spring-bolt is forced out of engagement with the rack, and the frame is free to move.

The grain end of my machine I support on a caster-wheel, D; but this will be made the subject of another application, and need not be here described.

The pinion B' and bevel-gear wheel $B^2$ are secured on the ends of the shaft that passes through the hollow pivot of the arm $C^3$. The pinion is clutched to the shaft in the usual manner. The gear-wheel $B^2$ meshes into the bevel-gear wheel $B^3$, the two forming a miter-gear. The wheel $B^3$ is keyed to the shaft $b$, which carries the gear-wheel $B^4$. On the same shaft is secured the sprocket-wheel $b'$, which, through the instrumentality of the chain $x^2$, gives motion to the conveying-chain shaft F', upper packer-shaft $g$, and the butt-adjusting mechanism. This chain is kept taut by the tightening-wheel $x'$. Gearing into the wheel $B^4$ is the wheel $B^5$, mounted securely on the shaft $e$, that carries the lower packer, and behind said wheel is the pinion $d$, loose thereon. Between the wheel $B^5$ and pinion $d$, and close to the latter, is keyed the driver-arm $d'$. To the pinion $d$ is pivoted a pawl, $d^2$, and this, with the driver, constitutes the clutching mechanism, of the form shown and fully described in many recent patents; hence I deem further mention unnecessary, other than to say that by its use the constantly-running shaft $e$ is made to give intermittent motion to the binding mechanism. A gear-wheel, E, is keyed to this shaft in such a position as to drive the cutter-bar, as shown in Figs. 1 and 3. The mechanism shown in the drawings for driving the cutting apparatus I reserve for another application.

The lower packer-shaft, $e$, is journaled in proper bearings, and is provided with two cranks, as shown in Figs. 5, 11, 12, and 13. $e'$ $e'$ are the packers, mounted on and carried by the cranks, and which have extended shanks reaching well outward and passing through the guides $e^3$. Each packer has two teeth, $e^4$ and $e^5$, the last only of which passes outside of the arc of the guard on the back of the needle. They bring the grain with a force that is easily resisted, so that when the needle is up and obstructs the passage of the grain they will have but the effect to mass it upward. The teeth $e^4$ being within the guard of the needle when the latter is up, said guard keeps the accumulation of grain away from said teeth $e^4$. The teeth are of such length in proportion to the throw of the cranks that they will draw well below the table while moving back to take a new hold and be thrust well upward through slots in the table when moving forward in contact with the grain. These arms $e'$ $e'$ constitute the packers proper.

The band-carrying and band-uniting mechanism and the bundle-discharging device are of forms much used, and, constituting no part of this invention, need not be described.

F F are the platform carrier-chains. They are provided with teeth which engage the grain as it falls and convey it toward the binder. They reach from the divider, where they run around supporting guide-wheels to a series of sprocket-wheels on the shaft F'. (Shown in Figs. 1, 3, and 13.) The wheels driving these chains are partially flanged in such a way that they are in effect strippers of the chain-teeth, as fully shown and described in my Patent No. 219,871.

G is the platform-decking, and $G^2$ the binding-table, while G' is an inclined passage-way connecting the two.

Above the binding-table are certain parts which form an upper limit to the grain passage-way, as well as performing other functions.

The upper packer-shaft, $g$, is journaled in posts reaching upward from the main frame, and, as before stated, is driven by the chain $x^2$, which passes over the sprocket-wheel $g^4$. This shaft $g$ is provided with three pairs of cranks, $g'$. The cranks in each pair are connected together by means of a disk, $g^2$, which is a little greater in diameter than the throw of the cranks. Upon and carried by these cranks are the upper packers, $h\ h$, having extended shanks which slide in the guides $h^2$, and having their operating points directed downward toward the table. When the shaft is revolved in the direction indicated by the arrow in Figs. 3 and 13, the points of these packers will be thrust downward into the grain brought in by the carrier-chains, and will carry it onward until they are finally withdrawn from it within the circumference of the disks $g^2$. These disks in addition to forming strippers for the packer-teeth, which are close beside them, form a moving upper limit to the passage-way for the grain, which I find very beneficial.

The cheek-pieces $i^2$, between which the point of the needle passes, and which are secured to the breast-plate $i$ and the stripping-board $i^3$, also contribute to the formation of the upper limit. I leave a space, as shown in Fig. 3, between the disks $g^2$ and the ends of the cheek-pieces, which space forms a reservoir for the accumulation of the grain acted upon by the fingers $e^5$ of the lower packers and the teeth $g'$ of the upper packers, while its progress is arrested by the needle-guard when the needle is thrown up. $j$ is a bar reaching fore and aft above the binding-table. To this bar the breast-plate $i$ and the guides $h^2$ are secured. A bar of wood, $j'$, is also secured at one end to the bar $j$, and its other end is supported by a proper bearing on the shaft $g$, as shown in Figs. 3 and 6. Beneath this bar is bolted by its end a strong spring, I, with its free end reaching well toward the cheek-pieces $i^2$.

It will be seen that my reservoir has an elastically-yielding upper limit, the spring acting to force the accumulated grain instantly downward as soon as the needle falls to permit its advance. In over-ripe grain that is very light and tangled, gravity cannot be depended upon for this purpose, and the difficulties encountered under such circumstances are by this means fully overcome, and I have an automatically-discharging reservoir.

To assist in conveying the grain along on the table, and to give it any desired direction, I employ a butt-adjusting belt, H, similar to that shown in my Patent No. 223,812, January 27, 1880. It consists in this case of a frame with drums journaled at each end, the drum near the cutting apparatus being the driver's, and its journals forming pivots on which the the frame is adjusted. The upper journal is extended upward, and is provided with a miter-pinion, $k$. $l$ is a shaft reaching through the front frame-work of the binder and carrying the sprocket-wheel $l'$ and the miter-pinion $l^3$. The chain $x^2$, passing over the sprocket-wheel $l'$, gives movement to the butting mechanism. I locate this device in such relation to the line of travel of the butts of the grain that if swung parallel with the front of the frame, as shown in Fig. 1, it will engage the butts only enough to even them. If, however, it is wished to change the direction of the travel of the grain, as when short grain is engaged, it may be moved into the position shown in Figs. 5 or 6. As means for adjusting the butt-belt, I connect the rod $m$ to the arm $m'$, secured to the frame of the belt H. This rod being within easy reach of the driver he may move the adjusting butt-belt at will.

My tripping mechanism consists of the following parts:

$d$ is the pinion loose on its shaft $e$.

$d'$ is the driver-arm keyed to the shaft and provided with two rollers, which are in effect but abutments to engage with the peculiarly-constructed pawl $d^2$, carried on the pinion $d$, all of which are well understood and much used.

$n$ is a detent-lever vibrating on a pivot on the frame coincident with the axis of the needle-shaft, so made because of ease of construction, it being only necessary to provide it with an eye large enough to adapt it to vibrate freely on the bearing that projects from the binder-frame. This lever is directed toward the clutching device, and is of such length as to engage with the pawl $d^2$ and thus disengage it from the driver $d'$. I extend the lever in the opposite direction and provide the end with the slot $n^2$, into which the pivot $p^2$ (see Fig. 8) enters. This pivot is formed by the lower end of the link $p$ being bent to pass through the eye in the crank $p^5$ of the compressor-shaft $p^4$.

$p^4$ is the shaft upon which the compressor $p^3$ is firmly secured, and is of such length that the compressor shall be opposite the needle and the crank $p^5$ be beneath the cam and gear-wheel K, that gives it motion, as hereinafter described. When in position to be acted upon by the grain, the compressor $p^3$ is in the position shown in Fig. 3, and as the grain is compacted against it by the packers it yields to the position shown in Fig. 4, which movement, through the shaft $p^4$ and crank $p^5$, is transmitted to the lever $n$, throwing its end out of contact with the spring-pawl $d^2$, thus permitting the engagement of the clutching mechanism which starts the binding mechanism.

$o$ is a lever pivoted at $o^6$ to the binder-frame, and provided with the anti-friction roller $o^5$, that engages the cam-groove $g^\times$ in the gear and cam wheel K, which causes said lever to vibrate. This lever being connected by the link $p$ to the crank $p^5$ of the compressor-shaft $p^4$, the compressor-arm $p^3$ is turned down to permit the discharge of the bundle. To render the link elastically extensible, I provide it with a spring, and construct it as shown in patents to Appleby and others. This, as well as the clutching device, is well shown in Appleby's Patent No. 262,883, August 15, 1882.

The spring $p'$ is, from the nature of its work, made strong; but extensibility under slight pressure being required to allow the compressor-arm to yield to operate the tripping mechanism I inclose a supplemental spring, $o'$, in a barrel in the lever $o$, as shown in Fig. 8.

$o^2$ is a bolt with a large head provided with an eye, $o^4$, into which the upper end of the link $p$ is hooked. This bolt passes up through the barrel and spring, and is provided at its upper end with a nut. The spring is thus between the bottom of the barrel and the nut, and it will be seen that the tension of the spring can be varied by turning the nut up or down on the bolt. The bolt and spring are of such length that there will always be some movement of the bolt in the barrel, even though the nut has been turned down to give the spring its greatest tension. The connecting device thus has an elastic yielding motion sufficient to allow the arm $p^3$ to operate the tripping mechanism without materially affecting its function as a compressing device.

The shaft $C^{14}$ serves as a means for securing the tongue to the machine. The butt of the tongue and its brace are pivoted on said shaft, the brace at the end nearer the driver's seat, as shown in Figs. 1 and 2. The bars A A' of the frame are bent upward, so as to provide means for attaching the tongue at a point so high that the draft of the team will tend to take the weight of the machine off from the caster-wheel, and thus the objections urged against three-wheeled machines be largely removed.

The operation of my machine is as follows: The cut grain falls on the platform and is carried by the endless chains to the stubble end of the platform, where it is stripped by the partially-flanged wheels, over which the chains pass. Being then engaged by the upper packers it is carried onward, and by the lower packers is compacted against the tripping compressor, which, by the yielding of the spring $o'$, is permitted to give way slightly, and through its shaft and crank-arm lift the detent from the clutch-pawl $d^2$, when the pinion $d$ will be locked to its shaft and the binding mechanism be given a revolution through the instrumentality of the train of gears K K' $K^2$. At nearly the completion of the revolution of the cam and gear wheel K the outthrown part of the cam $g^x$ swings the lever $o$ downward, and the compressor-arm $p^3$ is thus dropped below the decking to allow the bundle to be discharged over it. It remains there for an instant, and is then drawn upward. The cranks carrying the upper packers are given greater throw at the butts than at the heads of the grain, and the lagging butts are thus urged forward. The butt-adjusting canvas also assists in this last operation.

What I claim is—

1. The combination of the side bars, A A', bent upward in front, the relatively-vibrating wheel-frame pivoted thereunder, the transverse bars tying said side bars together, the yoke $A^4$, the bar $A^{11}$, and the caster-wheel pivoted to said yoke and bar, substantially as described.

2. The combination of the harvester-frame, the wheel-frame relatively vibrating thereunder, the windlass and rope mechanism adapted to effect the vibration of the wheel-frame relatively to the main frame, and the tongue pivoted to said windlass-shaft, all combined and arranged substantially as and for the purpose set forth.

3. In a self-binding harvester, the combination of the shaft $g$, formed with one or more pairs of cranks, the disks located on said shaft adjacent to the cranks, and the packers carried on said cranks, substantially as and for the purpose set forth.

4. In a self-binding harvester, the combination of the shaft $g$, formed with one or more pairs of cranks, the disks located on said shaft adjacent to said cranks, and the packers carried on said cranks and provided with the extension $h$, supported by the guides $h^2$, substantially as and for the purpose set forth.

5. The binding-receptacle, the upper and lower packers, the breast-plate, the grain-reservoir formed between the upper packers and the breast-plate, and the yielding elastic arm I, all combined and arranged to operate substantially as described.

6. The packer-shaft $g$, the bar $j$, the bar $j'$, supported on said shaft and said bar $j$, and the spring-arm I, carried by said bar $j'$, substantially as and for the purpose described.

7. The packer-arms $e'$, provided with the teeth $e^5$, in combination with the grain-reservoir opposite said teeth and the elastic yielding arm I, substantially as and for the purpose described.

8. The combination of the rock-shaft provided with the compressor-arm and crank-arm, the clutching mechanism, and the detent-lever pivoted near its center to the frame and connected at one end to the crank-arm on the compressor-shaft and its other end adapted to engage with the clutching mechanism, substantially as and for the purpose described.

9. The combination of the clutching mechanism, the detent-lever, the compressor-arm, the cam-wheel, the connecting-rod $p$, the supplemental rod $o^2$, and spring $o'$, substantially as and for the purpose described.

10. The combination of the lever $o$, provided with the spring-casing, the spring $o'$, seated in said casing, the bolt $o^2$, passing through said case and spring and provided with the adjusting-nut $o^3$, the connecting-rod, and the tripping compressor-arm, substantially as and for the purpose described.

11. The combination of the cam-wheel K, the lever $o$, the elastically-extensible link $p$, the supplemental rod $o^2$, the spring $o'$, the compressor-arm $p^3$, the detent-lever $n$, and the clutch mechanism, substantially as and for the purpose described.

WILLIAM F. OLIN.

Witnesses:
JOHN B. KASPARI,
JOHN F. STEWARD.